Patented June 18, 1935

2,005,268

UNITED STATES PATENT OFFICE 2,005,268

TREATMENT OF FLOUR

Rudolf Rüter, Cologne-Deutz, Germany

No Drawing. Application January 23, 1934, Serial No. 708,000. In Great Britain October 19, 1933

13 Claims. (Cl. 99—10)

Many substances have been proposed for improving the color, the keeping and baking qualities of flour, all on the basis of chlorine. Well known and much used among these is the addition of nitrogen trichloride in spite of several attendant inconveniences. It has a strong bleaching effect, a relatively great quantity must be used for obtaining the maximum of good baking quality, and sometimes the flour turns grey.

The use of halogenated organic amines has also been proposed, especially such as are derived from para-toluol sulfonic acid and from para-sulfobenzoic acid, those particularly known being the salts of these acids on the base of potassium, sodium, bromine and iodine.

Too, the use of halogenated inorganic amines has been recommended for maturing the flour, for improving the color, the keeping and somehow the baking quality.

An object of my invention is the addition of substances in the treatment of flour that improve principally the baking quality without having any noticeable bleaching effect, because bleaching diminishes, as is generally well known, the nutritive power of flour, for which reason, in some countries additions with bleaching effect are forbidden.

Now by numberless trials I have found out that the following substances will improve the baking qualities of flour, but avoid nearly all objectionable side-effects. They belong to the class of the organic amines and have not heretofore been proposed.

Substances which I have found to produce the desired results satisfactorily are as follows:

Methyldichloramine $CH_3—NCl_2$
Ethyldichloramine $C_2H_5—NCl_2$
Propyldichloramine $C_3H_7—NCl_2$
Butyldichloramine $C_4H_9—NCl_2$
Dimethylchloramine $(CH_3)_2—NCl$
Diethylchloramine $(C_2H_5)_2—NCl$
Dipropylchloramine $(C_3H_7)_2—NCl$
Dibutylchloramine $(C_4H_9)_2—NCl$ In general there has to be added in finest division of these substances, 5 to 6 grams to 100 kilograms of flour, but there are flours that require less, e. g., 1, 2 or 3 grams will produce the desired effect, while other qualities of flour will require 15 grams and even more, the quantity to be added being found for each flour by trials.

What I claim is:

1. The process for improving the baking quality of flour which consists in the addition to flour of substances from the homologous series $CH_3$, $C_2H_5$, $C_3H_7$, $C_4H_9$ combined with chlorinated nitrogen.

2. The process for improving the baking quality of flour by adding to it in finest division methyldichloramine.

3. The process for improving the baking quality of flour by adding to it in finest division ethyldichloramine.

4. The process for improving the baking quality of flour by adding to it in finest division dimethylchloramine.

5. The process of improving the baking quality of flour comprising adding thereto an alkylchloramine wherein the alkyl group is of the homologous series $CH_3$, $C_2H_5$, $C_3H_7$, $C_4H_9$.

6. The process of improving the baking quality of flour comprising adding thereto an alkyldichloramine wherein the alkyl group is of the homologous series $CH_3$, $C_2H_5$, $C_3H_7$, $C_4H_9$.

7. The process of improving the baking quality of flour comprising adding thereto a dialkylchloramine wherein the alkyl group is of the homologous series $CH_3$, $C_2H_5$, $C_3H_7$, $C_4H_9$.

8. A flour with improved baking quality containing an alkylchloramine wherein the alkyl group is of the homologous series $CH_3$, $C_2H_5$, $C_3H_7$, $C_4H_9$.

9. A flour with improved baking quality containing an alkyl-dichloramine wherein the alkyl group is of the homologous series $CH_3$, $C_2H_5$, $C_3H_7$, $C_4H_9$.

10. A flour with improved baking quality containing a dialkylchloramine wherein the alkyl group is of the homologous series $CH_3$, $C_2H_5$, $C_3H_7$, $C_4H_9$.

11. A flour with improved baking quality containing methyldichloramine.

12. A flour with improved baking quality containing ethyldichloramine.

13. A flour with improved baking quality containing dimethylchloramine.

RUDOLF RÜTER.